United States Patent [19]

Golden

[11] 4,412,611
[45] Nov. 1, 1983

[54] TRANSPORT MECHANISM

[75] Inventor: Michael D. Golden, Costa Mesa, Calif.

[73] Assignee: Western Design Corporation, Irvine, Calif.

[21] Appl. No.: 314,666

[22] Filed: Oct. 26, 1981

[51] Int. Cl.³ .............................................. B65G 47/26
[52] U.S. Cl. ....................................... 198/450; 89/34
[58] Field of Search ............... 198/441, 447, 448, 449, 198/450; 89/33 BA, 33 BC, 34

[56] References Cited

U.S. PATENT DOCUMENTS

3,625,103  12/1971  Giatti ............................. 198/450 X
3,720,301   3/1973  Garland et al. ................. 198/450 X

Primary Examiner—John J. Love
Assistant Examiner—Paul A. Sobel
Attorney, Agent, or Firm—Harvey C. Nienow

[57] ABSTRACT

A transport mechanism for use in material handling systems whereby a multiplicity of like objects are automatically and rapidly transported from a storage compartment thereof to a predetermined location. Such mechanism receives a plurality of such objects at each of two or more spaced inlet openings, causes the objects to be interleaved in a predetermined sequential manner, and to be successively fed in a single row to said predetermined outlet location. The objects received through each inlet opening are caused to be spaced with respect to each other and with respect to the objects received through the other inlet opening or openings in accordance with the size of each object and in accordance with the number of inlet openings employed, and are then interleaved with the objects from the other inlet openings to come together at the outlet opening in a single row for placement individually and sequentially in a given position at said predetermined location.

15 Claims, 9 Drawing Figures

TRANSPORT MECHANISM

The present invention relates generally to transport mechanisms for use in material handling systems, but more particularly to such mechanisms which are capable of receiving concurrently at two or more spaced inlet openings, a plurality of like objects, and of causing them to come together in a single row at a single outlet opening to be fed to a predetermined location.

Many industries and other business and non-business activities require the handling of a great many like articles or objects within a short period of time. This is certainly true with respect to mass production manufacturing operations wherein profitability depends upon performing a specific manufacturing, distribution or handling function within an extremely short period of time so as to more effectively utilize both labor and capital.

High speed material handling systems are also required for reasons other than profitability, as for instance in the making of modern-day armaments where there is a need for handling a large quantity of bullets or projectiles for rapid firing guns and the like.

In all such applications, it is desirable to move accurately, effectively and at an extremely high rate of speed, a plurality of like objects from a storage compartment or reservoir of such objects, to a predetermined location such as the breech of a high speed weapon. Further complicating the requirements is the need to have the objects or articles stored in maximum high density manner because space is usually at a premium. Thus the articles must be moved from such high density storage condition to the predetermined location at such extreme rate of speed and in such accurate and effective manner.

Heretofore, such material handling systems have been relatively slow in operation, being unable to transport the objects from their storage compartment or compartments to the predetermined location in a consistent, foolproof manner and at high speed. With respect to a military weaponry, it will be readily understood that such slow, unreliable systems have been responsible for many unfortunate results such that military positions have been overtaken due to the inability of weapons to fire projectiles consistently and at high speed.

It is an object of the present invention to provide a transport mechanism for rapidly and sequentially transporting a plurality of like objects from a storage compartment to a predetermined location.

Another object of the present invention is to provide a transport mechanism as characterized above whereby a plurality of like objects are fed substantially concurrently through a plurality of spaced inlet openings of the mechanism and thereafter are rapidly and accurately arranged in a single row and in side by side relation for transport to a predetermined location.

A still further object of the present invention is to provide a transport mechanism as characterized above which is adaptable for handling substantially any size or shape of like objects for transporting them from a storage compartment to the predetermined location.

Another still further object of the present invention is to provide a transport mechanism as characterized above which permits high density storage of objects within the storage compartment and which permits maximum design alternatives in constructing the storage compartment regardless of the size and shape of the like objects.

An even still further object of the present invention is to provide a transport mechanism as characterized above which is virtually entirely mechanical in nature, utilizing reliable physical drive mechanisms for spacing the objects and then interleaving or merging them into a single row to be transported to the predetermined location.

Another still further object of the present invention is to provide a transport mechanism as characterized above which is simple and inexpensive to manufacture and which is rugged and dependable in operation.

The novel features which I consider characteristic of my invention are set forth with particularity in the appended Claims. The invention itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
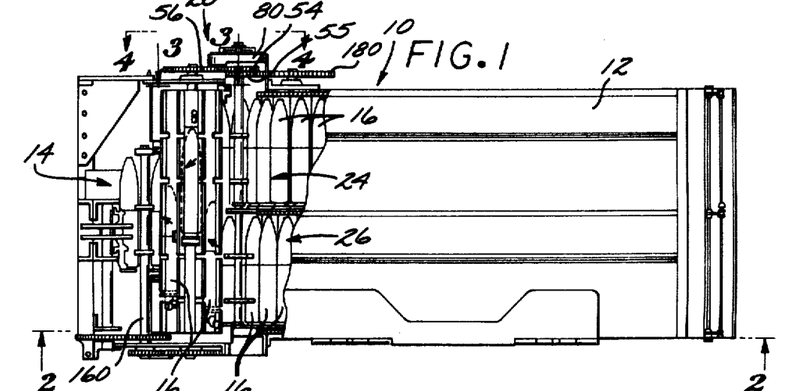
FIG. 1 is a fragmentary elevational view of a transport mechanism according to the present invention showing objects being transported from a storage compartment to a predetermined location.

Referring to FIG. 1 of the drawings, there is shown therein a material handling system 10 wherein like objects are transported from a storage compartment 12 to a predetermined location 14. Such like objects are shown in FIG. 1 as being projectiles or machine cannon rounds 16 for use in an automatic weapon (not shown), and are to be transported by the material handling system 10 to the predetermined location 14. Although the subject invention has extremely important application to military weaponry for fast and effective weapons of all sizes, it is realized that the subject invention is equally applicable to the transporting or feeding of other kinds of like objects such as beverage bottles, plastic containers, boxes and the like, and, for that matter, substantially any other kind of object which is required to be rapidly fed to a given or predetermined location. Although reference heretofore and hereinafter may be made to projectiles for use in weaponry, such term is to be understood as including substantially any and all kinds, sizes and shapes of objects.

Figure 2:
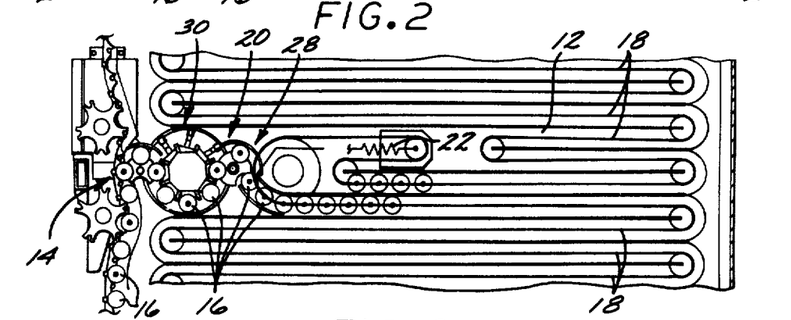
FIG. 2 is a fragmentary sectional view taken substantially along line 2—2 of FIG. 1.

The storage compartment 12 for the projectiles 16 may take substantially any desired form, but is shown in FIGS. 1 and 2 as comprising an endless belt or chain 18 whereon the projectiles 16 are individually positioned and mounted, as shown diagrammatically in said FIGS.

1 and 2, so that automatic drive means can be employed to feed such projectiles to the subject transport mechanism 20. That is, by means of a suitable source of power for driving endless belt 18, the projectiles 16 can be fed from the storage compartment 12 to the transport mechanism 20. A device including a biasing spring 22 is shown diagrammatically in FIG. 2 to provide the endless belt or chain 18 with constant tension for proper operation.

As shown most clearly in FIG. 1 of the drawings, the projectiles 16 are arranged in a plurality of levels or banks or bays to facilitate simultaneous feeding of a plurality of such projectiles from several different sources thereby increasing the speed with which the projectiles can be brought into the transport mechanism. Although the representation shown in the drawings is with respect to two projectile banks or bays 24 and 26, it is well realized that the number of such bays can be increased as desired, with the subject invention being equally applicable to any number of such bays.

It is a significant feature of this invention that the transport mechanism be so constructed and operable as to receive projectiles 16 or other objects at an extremely fast rate and from maximum density storage where space is utilized to maximum efficiency. Accordingly, transport mechanism 20, as will hereinafter become more apparent, is adaptable to working with a storage compartment 12 wherein the projectiles are stored adjacent each other and are brought out as high speed in such side-by-side relation.

Figure 7:
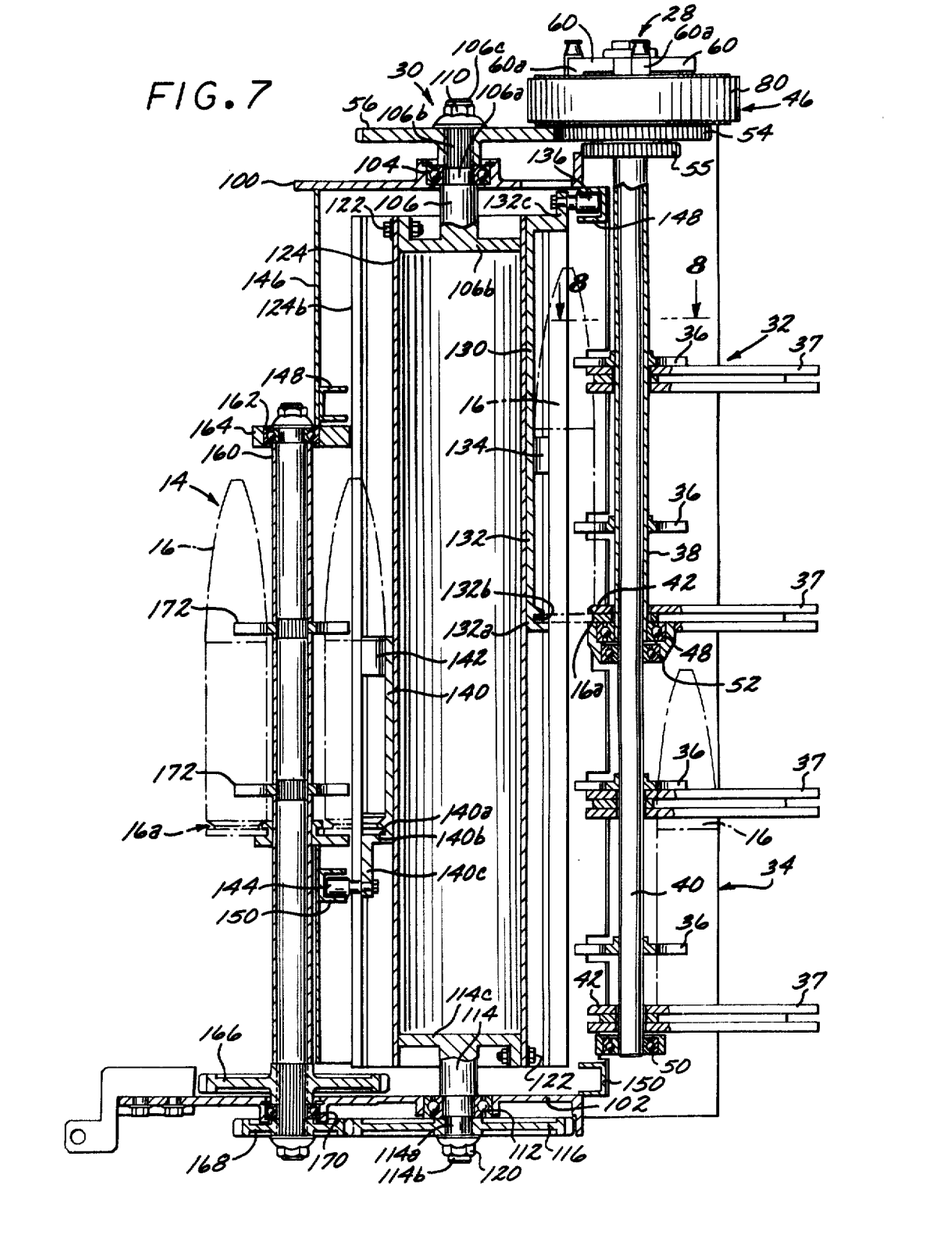
FIG. 7 is a sectional view taken substantially along line 7—7 of FIG. 4.

The transport mechanism 20 includes, as shown most particularly in FIG. 7 of the drawings, a spacing unit 28 and a merging unit 30. Spacing unit 28, in conformance with the construction of storage compartment 12 having two bays or levels 24 and 26 of projectiles 16, is formed with two inlet openings 32 and 34. Each such opening is adapted to receive in a sequential manner a plurality of such projectiles 16. To accomplish this, each level of the spacing unit 28 is provided with retainers 36, each of which is provided with three arcuate cutouts 36a, into each of which cutouts a projectile is placed as it is received through the corresponding inlet opening. To facilitate moving the projectiles from the endless chain 18 to the retainers 36, guide members 37 are provided to direct or guide the projectiles through the inlet openings 32 and 34. It will be noted, as shown in FIG. 7, that the upper portion of the spacing unit 28 has two such retainers 36, as does the lower portion thereof.

The retainers 36 are mounted on a rotatable shaft for receiving the projectiles as the retainers are rotated. The upper retainers 36 are fixed to a hollow outer shaft 38, and the lower retainers 36 are fixed to a solid inner shaft 40 which extends through the shaft 38.

Because of the particular construction of the projectiles 16, each of the lower guide members 37 is further provided with a protrusion 42 which is so positioned and adapted to receive the shallow annular recess 16a at the base of the projectile. As will hereinafter become more apparent, protrusion 42 insures proper vertical orientation of the projectiles entering through inlet openings 32 and 34 as they pass through the spacing unit 28.

At the top of spacing unit 28, as shown in FIG. 7 of the drawings, is a drive mechanism or transmission 46 for rotating the concentrically arranged shafts 38 and 40 in a predetermined sequence or manner, as will hereinafter be explained in greater detail. To enable shaft 38 to properly rotate, a suitable bearing 48 is provided between the lower portion of shaft 38 and a frame member. In similar fashion, a suitable bearing 50 is provided between the lower extremity of shaft 40 and a frame member, and another bearing 52 is provided between an intermediate portion of shaft 40 and a frame member.

As the projectiles 16 are received at the inlet openings 32 and 34, they are guided into the retainers 36 by guide members 37. From there, the projectiles are transported by the rotating shafts 38 and 40 to a position essentially diametrically opposite the inlet openings. To accomplish this, a gear member 54 is provided, to be driven by a drive gear 56 which is part of the merger unit 30, and which is connected to a suitable source of rotational power (not shown). When the subject transport mechanism 10 is operating, gear 56 is driven at a constant speed so as to drive gear 54 accordingly.

Figures 5, 6, 8:
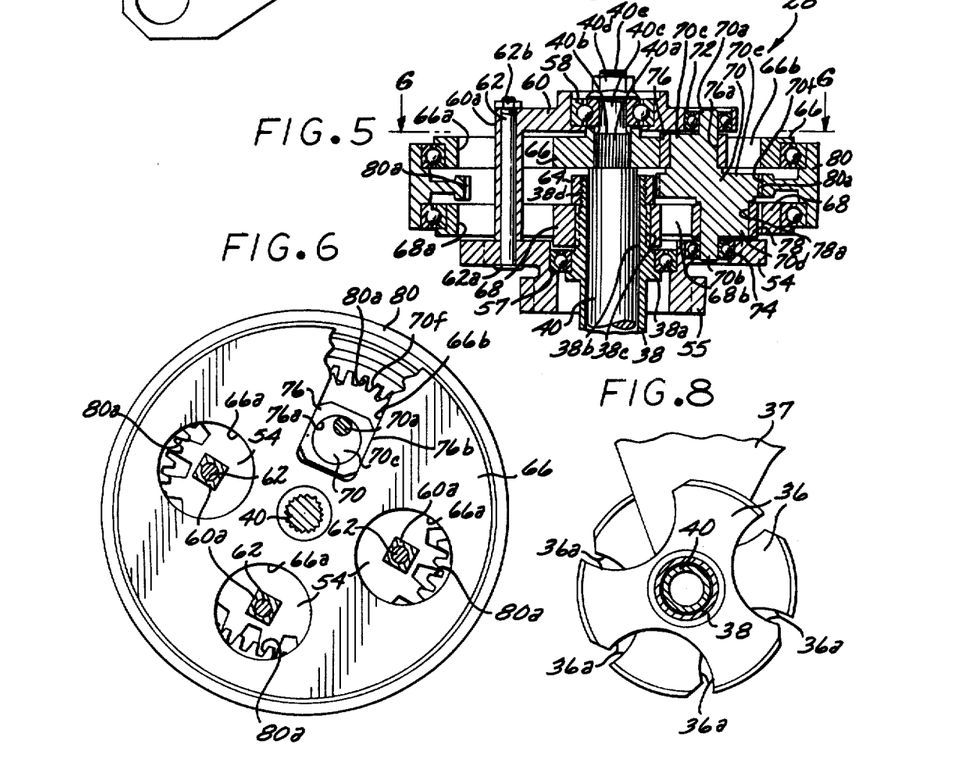
FIG. 5 is a fragmentary sectional view taken substantially along line 5—5 of FIG. 4.
FIG. 6 is a sectional view taken substantially along line 6—6 of FIG. 5.
FIG. 8 is a fragmentary sectional view taken substantially along line 8—8 of FIG. 7 of the drawings.

Referring to FIG. 5 of the drawings, a bearing 57 is provided between gear 54 and an enlarged portion 38a of shaft 38 so that gear 54 is maintained in proper coaxial relation with shaft 38.

The upper end of shaft 40 which extends beyond the upper end of hollow shaft 38 is formed with a reduced portion 40a having splines 40b, a further reduced portion 40c, and an end portion 40d having fastening threads 40e.

Figure 4:
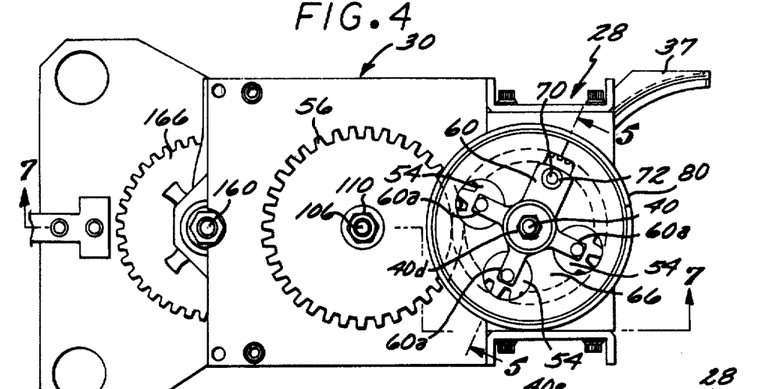
FIG. 4 is a top plan view of a portion of FIG. 1, taken substantially along line 4—4 thereof.

Mounted on the reduced portion 40c of shaft 40 is a suitable bearing 58 which carries connecting drive member 60, which is formed with three extensions 60a which are offset from each other by ninety degrees with respect to the axis of rotation of drive member 60 as shown most particularly in FIGS. 4 and 6 of the drawings. A threaded fastening bolt 62 having a head 62a and a fastening nut 62b is provided in each of such extensions 60a as shown most particularly in FIGS. 5 and 6 of the drawings.

The bearing 58 provides proper orientation of connecting drive member 60 with respect to the concentrically arranged rotatable shafts 38 and 40, as did bearing 57 for drive gear 54. portion 38b formed with splines 38c, and a reduced threaded end portion 38d which carries a fastening nut 64.

Fitted onto the splines 40b and 38c of the shafts 40 and 38, respectively, are cylindrical drive plates 66 and 68, respectively. As shown most particularly in FIGS. 5 and 6 of the drawings, each such drive plate 66 and 68 is formed with three circular openings as shown at 66a and 68a respectively, to accomodate the three extensions 60a of the drive member 60. That is, as shown in FIG. 5, each extension 60a of member 60 extends through openings 66a and 68a in the drive plates 66 and 68.

To effectively rotate the shafts 38 and 40 from gear member 54 and connecting drive member 60, a drive pinion 70 is provided therebetween, as shown. Such pinion is formed with upper and lower end portions 70a and 70b which are mounted in the inner races of bearings 72 and 74, respectively, the outer races thereof being fitted within suitable openings in drive member 60 and gear 54, respectively. Drive pinion 70 is further formed with eccentric shaft portions 70c and 70d shown most particularly in FIG. 5.

Each of the drive plates 66 and 68 is formed with a rectangular cutout as shown at 66b and 68b, respectively. As shown most particularly in FIG. 6 with respect to drive plate 66, the rectangular cutout 66b is offset ninety degrees with respect to the aforedescribed circular openings 66a. A bushing 76 formed with a cylindrical opening 76a for rotatably receiving the cylindrical eccentric shaft portion 70c, as shown in FIG. 6, is provided with a generally square or rectangular outer periphery, as shown at 76b so as to have only reciprocatory motion within opening 66b of drive plate 66. That is, as will hereinafter become more apparent, bushing 76 is restricted to radial, reciprocatory movement within slot or opening 66b of drive plate 66.

In like fashion, a bushing 78 having a cylindrical through opening 78a and a generally square or rectangular outer periphery 78b is provided to receive eccentric shaft portion 70d of drive pinion 70. The bushing 78 slidably fits within the slot or opening 68b formed in drive plate 68.

Drive pinion 70 is further formed with a cylindrical intermediate portion 70e whose axis coincides with the axis of rotation of pinion 70 as defined by the end portions 70a and 70b within bearings 72 and 74. Such intermediate portion 70e is formed with external gear teeth 70f which mate with the internal gear teeth 80a of a stationary ring gear 80. Such ring gear 80 is mounted on the frame of the spacing unit 28, stationary relative to the rotation of shafts 38 and 40, as will hereinafter become more apparent.

The spacing unit 28 operates generally as follows: The projectiles 16, as shown in FIG. 2 of the drawings, are fed into the inlet openings 32 and 34 by means of the aforedescribed chain drive 18 and guide members 37. In this regard, as shown in FIG. 2, the individual projectiles are positioned in one of the three arcuate openings 30 in the retaining members 36 at the respective level at which such projectiles enter the unit 28. The concentrically arranged shafts 38 and 40 are continuously rotated as follows: Referring to FIG. 5 of the drawings, the gear 54 is driven at a constant angular speed by virtue of the drive gear 56. The drive member 60 is rotated with drive gear 54 as a result of being firmly connected thereto through the three extensions 60a and fastening bolts 62. This causes drive pinion 70, as defined by its axis extending through the end portions 70a and 70b thereof, to follow a circular path about the axis of rotation of the concentrically arranged shafts 38 and 40. Engagement of pinion 70 with the drive plates 66 and 68 through the bushings 76 and 78, respectively, causes such movement of pinion 70 to rotate shafts 38 and 40. This results from the fact that the drive plate 66 is firmly secured to shaft 40 by virtue of the firm engagement of the former with the splines 40b on the latter, and by virtue of the firm engagement between drive plate 68 and the splines 38c on shaft 38. Such rotation of shaft 38 causes each projectile 16 in the upper portion of the spacing unit 28 to be rotated from the inlet opening 32. In like fashion, rotation of shaft 40 causes the projectile in the lower portion of the spacing unit 28 to have similar rotational movement from the inlet opening 34.

As drive pinion 70 is so actuated to rotate the shafts 38 and 40 through their respective drive plates 66 and 68, pinion 70 is caused to rotate about its own axis as defined by end portions 70a and 70b thereof. This results from engagement of gear teeth 70f of pinion 70 with gear teeth 80a of stationary ring gear 80. Such rotational movement of pinion 70 about its own axis causes eccentric shaft portions 70c and 70d to follow paths about the axis of rotation of pinion 70, producing a reverse movement component and thereafter a forward movement component to the movement of the respective drive plates 66 and 68 about the axis of rotation of the shafts 38 and 40. By designing the eccentric shafts accordingly, the rotational speed of shafts 38 and 40 can be varied while the projectiles are being transported from the respective inlet openings of the spacing unit 28 to the outlets thereof.

Depending upon the number of inlet openings in the spacing unit 28, the drive pinion 70 is so constructed with eccentric shaft portions that the projectiles 16 are moved at a faster speed at the outlet portion of the spacing unit 28 as compared to their speed upon entering unit 28 at the inlet openings thereof. This causes the space between adjacent projectiles to be increased proportionately. By coordinating such increase in angular speed with the relative position of the retainers 36 on the respective shafts 38 and 40, a space is developed between adjacent projectiles at at each level, which space is aligned with one of the projectiles at the other level. This enables the several levels of projectiles to be merged subsequently into a single row of projectiles with the proper spacing therebetween.

Figure 9:
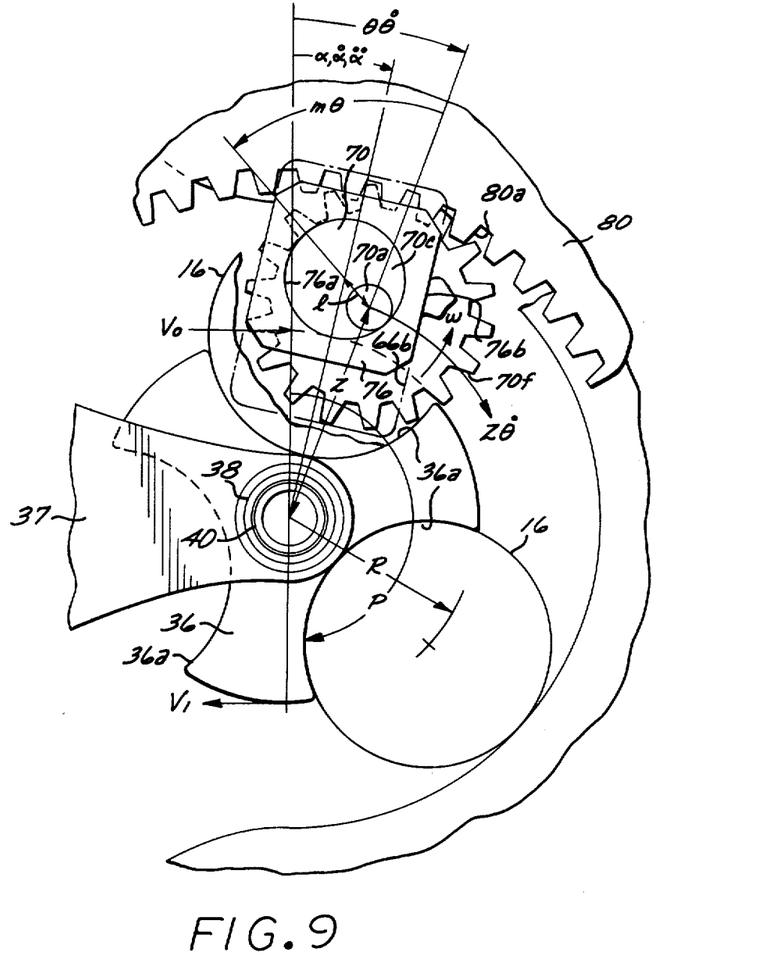
FIG. 9 is a phantom view showing the relationship between certain control and transport members.

The present invention will be better understood and appreciated from the following mathematical description and the kinematic diagram of FIG. 9.

| Symbol | Description | Example Value |
|---|---|---|
| $S_1$ | Outlet item spacing, inches | 2.1 |
| $f_1$ | Outlet feed rate, items/second | 30 |
| n | Number of inlet rows | 2 |
| $S_o$ | Inlet item spacing, inches | 1.5 |
| $f_o$ | Inlet feed rate, items/second | 15 |
| $V_1$ | Outlet item velocity, inches/second | 63 |
| $V_o$ | Inlet item velocity, inches/second | 22.5 |
| $\mu$ | Velocity ratio = $V_1/V_o$ | 2.8 |
| $p$ | Angle between inlet(s) and outlet, degrees | 180 |
| m | Number of retainer positions (per row) | 3 |
| $\theta$ | Angular position of gear 54, degrees | variable |
| $\dot\theta$ | Angular velocity of gear 54, rev/sec | 5 |
| $\ddot\theta$ | Angular acceleration of gear 54, (assumed zero) | 0 |
| $\omega$ | Angular velocity of pinion 70, rev/sec | −10 |
| d | Pitch diameter of pinion gear 70f, inches | 1.5 |
| D | Pitch diameter of ring gear 80a, inches | 4.5 |
| Z | Distance between retainer shaft 38 & 40 $C_L$ and pinion 70 $C_L$, inches | 1.5 |
| l | Pinion offset (distance between 70a $C_L$ and 70c $C_L$), inches | .25 |
| e | Mechanism eccentricity = $\frac{Z}{l}$ | 6 |
| $\alpha$ | Angular position of retainer 36a, degrees | variable |
| $\dot\alpha$ | Angular velocity of retainer 36a, rev/sec | 8 max, 5 avg, $2\frac{6}{7}$ min |
| $\ddot\alpha$ | Angular acceleration of retianer 36a, rad/sec² | ±1686 max |
| R | Pitch radius of retainer 36a, inches ($C_L$ distance between 36a and shafts 38 & 40) | 1.253 |

The design problem generally begins with given values for the outlet item spacing ($S_1$), the outlet feed rate ($f_1$), the number of inlet rows (n) and the inlet item spacing (So). For this example the respective values are 2.10 inches, 30 items/second, 2 rows and 1.50 inches. The following parameters are immediately calculable.

Inlet feed rate $$f_0 = \frac{f_1}{n} = \frac{30}{2} = 15 \text{ items/second}$$

Outlet item velocity
$V_1 = f_1 S_1 = 30 \times 2.10 = 63.00$ inches/second
Inlet item velocity
$V_o = f_o S_o = 15 \times 1.50 = 22.50$ inches/second
Velocity ratio $$\mu = \frac{V_1}{V_o} = \frac{63.00}{22.50} = 2.80$$

Or $$\mu = \frac{nS_1}{S_o} = \frac{2 \times 2.10}{1.50} = 2.80$$

Depending upon the geometry required, the designer will have a desired value for the angle between the inlet and outlet ($\rho$) and may proceed to choose the number of retainer positions (m). However he is restrained by the requirement that the mechanism repeats its cycle every 360°/m in order that the inlet and outlet velocities are the same at all interfaces with the m cutouts (36a). By way of example, if $m = 2$ then $\rho = 90°$ or $270°$
$m = 3$     $\rho = 60°$ or $180°$ or $270°$
$m = 4$     $\rho = 45°$ or $135°$ or $225°$ or $315°$
the specific requirement being $$\rho = \frac{180°}{m} + \frac{360°}{m} i$$

where i is either zero or a positive integer

It is further noted that it is usually desireable, in order to obtain an efficient form for the cutouts 36a, to arrange interface with the inlet to occur slightly past the minimum velocity point (i.e., at a higher velocity), and to interface with the outlet slightly past the maximum velocity point (i.e., at a lower velocity). This will result in a small compensating adjustment to $\rho$.

However, for the purposes of this example, let us assume that interface at the inlet and outlet is to occur at the minimum and maximum velocity points respectively, and the desired value for $\rho$ is 180°. Therefore, m is chosen to be 3 (i=1) and the speed of gear 54 (and the average speed of shafts 38 & 40) is $$\theta = \frac{f_1}{mn} = \frac{30}{3 \times 2} = 5 \frac{rev}{sec}$$

Now pinion 70 must rotate m revolutions with respect to gear 54, for every revolution of gear 54. Various planetary gear arrangements are available to accomplish this. The arrangement selected for this particular embodiment results in rotation of pinion 70 opposite to that of gear 54. Therefore, the rotational speed of pinion 70 is $$\omega = -(m-1)\theta = -2\theta = -10 \text{ rev/sec}$$

and the pitch diameter ratio of ring gear 80a to pinion 70f is $D/d = m = 3$

Selecting $d = 1.5$ inches $D = md = 4.5$ inches $Z = (D-d)/2 = 1.5$ inches

Referring to FIG. 9, the equations of motion for the spacing unit (retainer 36) are:

$$\alpha = \theta - \tan^{-1}\left[\frac{\sin(m\theta)}{e + \cos(m\theta)}\right]$$

$$\dot{\alpha} = \left[1 - \frac{m(e\cos(m\theta) + 1)}{e^2 + 2e\cos(m\theta) + 1}\right]\dot{\theta}$$

$$\ddot{\alpha} = \frac{m^2 e \sin(m\theta)(e^2 - 1)}{(e^2 + 2e\cos(m\theta) + 1)^2}(2\pi\dot{\theta})^2$$

$(\ddot{\theta} = o)$

The maximum and minimum velocities are:

$$\dot{\alpha} \max = \left[1 + \frac{m}{e-1}\right]\dot{\theta}$$

$$\dot{\alpha} \min = \left[1 - \frac{m}{e+1}\right]\dot{\theta}$$

The minimum velocities occur at $\theta = 0°$ and multiples of 360°/m, and the maximum velocities occur at $\theta = 180°/m$ plus increments of 360°/m. The required velocity ratio is $$\mu = \frac{\dot{\alpha} \max}{\dot{\alpha} \min} = \frac{e^2 + em + (m-1)}{e^2 - em + (m-1)}$$

Solving for the desired value of $\mu = 2.8$ yields $e = 6$
$l = Z/e = .25$ inches $\dot{\alpha} \max = \frac{8}{5}\dot{\theta}$ $\dot{\alpha} \min = \frac{4}{7}\dot{\theta}$ $\dot{\alpha} \max = 8$ rev/sec $\dot{\alpha} \min = 2\frac{6}{7}$ rev/sec $$R = \frac{V_o}{2\pi \dot{\alpha} \min} = \frac{V_1}{2\pi \dot{\alpha} \max} = 1.253 \text{ inches}$$

Peak angular accelerations occur at:

$$\theta = \frac{1}{m}\cos^{-1}\left[\frac{e^2+1}{4e} - \sqrt{\left(\frac{e^2+1}{4e}\right)^2 + 2}\right]$$

(and also at further increments of 360°/m) The peak accelerations are:

$\ddot{\alpha} \max = +1686$ rad/sec$^2$ at $\theta = 41.13°$
$\ddot{\alpha} \min = -1686$ rad/sec$^2$ at $\theta = 78.87°$ The peak tangential acceleration imposed on the item is:

$$A_t \text{ max} = \frac{R \, \alpha \text{ max}}{386} = 5.47 \, gees$$

The peak radial acceleration imposed to the item is:

$$A_R \text{ max} = \frac{R \, (2\pi \, \dot\theta \text{ max})^2}{386} = 8.20 \, gees$$

The above analysis allows one skilled in the art to forsee many useful permutations of this invention. A more detailed analysis which includes the effects of friction and pressure angles shows the mechanism to be capable of extremely high (although not infinite of course) outlet item velocities ($V_1$). Further, the mechanism may be configured to accomodate a zero (or even negative) inlet item velocity. The zero inlet velocity case is of particular interest for cross-feed applications where items are to be introduced into the inlet perpendicular to the direction of motion rather than tangentially. In this configuration the mechanism exhibits characteristics similar to a Geneva drive with zero dwell. By way of illustration, suppose the design parameters of the above example are adopted except the desired inlet velocity is taken to be zero and the outlet item spacing is taken to be 4.0 inches. Therefore:

$S_1 = 4.0$ inches
$f_1 = 30$ items/sec
$n = 2$
$S_o = 0$
$f_o = 15$ items/sec
$V_1 = 120$ ips
$V_o = 0$
$\mu = $ infinity
$\dot\theta = 5$ rev/sec
$d = 1.5$ inches
$D = 4.5$ inches
$Z = 1.5$ inches
$e = m - 1 = 2$
$l = Z/e = d/2 = .75$ inches $$\alpha \text{ max} = \left(1 + \frac{m}{m-2}\right) \dot\theta = 4\dot\theta = 20 \, rev/sec$$

$\alpha$ min $= 0$ $$R = \frac{120}{2\pi \times 20} = .955 \text{ inches}$$

$\alpha$ max $= +11,988$ rad/sec$^2$ @ $\theta = 52.36°$
$\alpha$ min $= 11,988$ rad/sec$^2$ @ $\theta = 67.63°$
$A_t$ max $= 29.7$ gees
$A_R$ max $= 39.1$ gees The motion of eccentric shaft portion 70c of pinion 70 is transmitted to the drive plate 66 via a journal bearing interface between eccentric shaft portion 70c and bushing 76 plus a sliding interface between bushing 76 and drive plate 66. Efficiency and power transmission may be readily improved by providing a connecting rod with anti-friction bearings between pinion eccentric 70c and drive plate 66. This of course will complicate the equations of motion but does not significantly change the kinematics of the mechanism.

Referring now to FIG. 7 of the drawings, merger unit 30 comprises an upper frame member 100 and a lower frame member 102. The upper frame member is provided with a suitable opening for retaining a bearing 104 for receiving a drive shaft 106. Such shaft is formed with an intermediate portion 106a for receiving the inner race of bearing 104, and a splined end portion 106b for non-rotably receiving the drive gear 56. The extreme end portion of shaft 106 is provided with fastening threads 106c for receiving a fastening nut 110. Shaft 106 is further provided with a mounting portion 106d.

In similar fashion, lower frame member 102 is provided with a through opening for receiving a bearing 112 which carries a rotatable shaft 114 having a splined portion 114a for non-rotatably receiving a gear 116. Shaft 114 is also provided with a threaded end portion 114b for receiving a fastening nut 120. A mounting portion 114c is formed integrally with shaft 114.

Fixed to the mounting portion 106d and 114c by means of bolts 122 at the top and bottom of unit 30, is a rotor 124 having eight vertically extending channels 124a provided by radially outwardly extending arms or partitions 124b. As shown most particularly in FIG. 3 of the drawings, each of such radial extending partitions 124b is formed with a pair of vertically extending grooves or slots as shown at 126 and 128.

Figure 3:
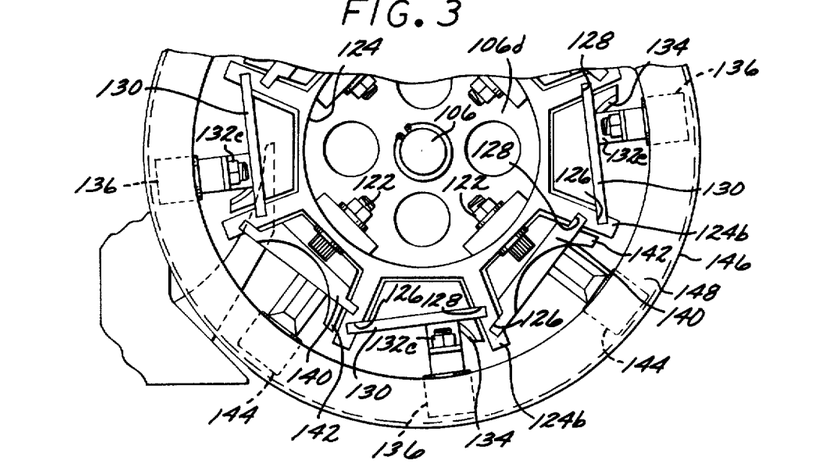
FIG. 3 is a fragmentary sectional view taken substantially along line 3—3 of FIG. 1.

As shown most particularly in FIG. 3 and 7 of the drawings, the upper portion of the merger unit 30 is provided with four vertically movable projectile holders 130, one for every other one of the aforementioned channels 124a formed in rotor 124 as shown in FIG. 3. Each such holder comprises a back portion 132 and an arcuate intermediate portion 134 as well as an enlarged lower portion 132a which is provided with a slot or opening 132b for receiving the lowermost edge of a projectile 16. The arcuate intermediate portion 134 is operable to receive and cradle the intermediate portion of the projectile.

The upper portion of member 132 is formed with an offset 132c which carries a horizontally disposed rotatable cam follower 136.

In like fashion, the lower section or level of the merger unit 30 is provided with four holders 140 having an arcuate intermediate portion 142 and a lower portion 140a which is formed with a groove or cutout 140b for receiving the lower edge of the projectile. Holder 140 is formed at its lower end portion with an offset 140c which carries a horizontally disposed rotatable cam follower 144.

A cylindrical outer housing 146 is bolted to upper frame member 100 and lower frame member 102, thus forming the primary structure of merger unit 30. An upper horizontally disposed U-shaped endless track 148 is fixed to the inner surface of such cylindrical outer housing 146 with varying elevation as shown in FIG. 7. The horizontally disposed cam follower 136 is positioned in track 148 so as the rotor is rotated by gear 116 through shaft 114, the holders 130 are caused to move vertically within the respective channels 124a of the rotor. The four upper holders 130 have their upper and lower portions slidably fitted within the slots 126 and 128 of the partitions 124b. Thus, by rotating the rotor approximately one hundred eighty degrees about its axis, the individual projectiles 16 are moved axially downward to an intermediate position, half-way between the upper and lower levels of the merger unit 30.

In like fashion, a lower endless channel 150 is fixed to the inner cylindrical surface of cylindrical outer housing 146, at the lower portion thereof. This enables the four lower projectile holders 140 to be cammed upwardly as the rotor is rotated about its axis, to the same intermediate position as aforedescribed.

The embodiment presented herein is intended to provide single row output at an intermediate position exactly halfway between the two axially spaced input rows. Thus endless tracks 148 and 150 are identical, as well as cam followers 136 and 144. However, output at any other desired position is readily obtained by varying the respective proportions of the two tracks.

From such intermediate position, as shown in FIG. 7, the projectiles are successively transferred to a transport mechanism including a rotatable shaft 160, the upper end portion of which is carried by a bearing 162 within an appropriate portion of the frame of the merger unit 30. The lower portion of shaft 160 carries a pair of gears 166 and 168 and is mounted in a bearing 170 within frame member 102.ABearing 168 is caused to mate with gear 116 to insure that shaft 160 rotates in accordance with the rate of rotation of the rotor of merger unit 30.

Shaft 160 comprises a pair of retainer members 172 whereby the projectiles 16 are removed from the merger unit 30 at the predetermined location.

As shown most particularly in FIGS. 1 and 5 of the drawings, a gear member 55 is formed integrally with gear 54 to drive a gear member 180 which is carried by a shaft in the storage compartment 12. Thus, the drive mechanism for the spacing unit 28 and merger unit 30 is utilized to drive the endless chain within the storage compartment 12 so that all of the components of the system are properly timed and coordinated. It is thus seen that the present invention provides a mechanism for sequentially taking a plurality of like objects from a storage compartment and feeding them to a predetermined location in a rapid and effective manner.

Although I have shown and described certain specific embodiments of my invention, I am well aware that many modifications thereof are possible. The invention, therefore, is not to be restricted except insofar as is necessitated by the prior art and by the spirit of the appended claims.

I claim:

1. For use in a material handling system for transporting a plurality of like objects from a storage compartment thereof to a predetermined location, a transport mechanism comprising in combination, means forming a plurality of inlet openings and one outlet opening, each of which is adapted to sequentially pass a plurality of said objects, means operatively interposed between said inlet openings and said outlet opening including a spacing unit having a rotatable shaft for each inlet opening individually adapted to retain said objects as said shafts are rotated, and a variable speed mechanism for varying the angular speed of each shaft to thereby vary the space between adjacent objects thereon for interleaving said objects from said inlet openings to form a single row of objects at said outlet opening.

2. For use in a material handling system for transporting a plurality of like objects from a storage compartment thereof to a predetermined location, a transport mechanism according to claim 1 wherein is included a source of power for rotating said shafts, and transmission means interposed between said source and each of said shafts comprising a drive member fixed to the respective shafts in radially extended position and a drive pinion in said drive member having connection with said source of power.

3. For use in a material handling system for transporting a plurality of like objects from a storage compartment thereof to a predetermined location, a transport mechanism according to claim 2 wherein said pinion is mounted in said drive member offset from the axis of rotation of each of said shafts to be driven by said source of power in a circle about said shafts to cause them to rotate.

4. For use in a material handling system for transporting a plurality of like objects from a storage compartment thereof to a predetermined location, a transport mechanism according to claim 3 wherein said pinion is rotatably mounted within each of said radially extended drive members and is formed with an eccentric shaft portion for each of said drive members for individual and separate engagement therewith, and means for rotating said drive pinion as it follows said circle to thereby cause said eccentric shaft portions to vary the speed of rotation of the respective shaft.

5. For use in a material handling system for transporting a plurality of like objects from a storage compartment thereof to a predetermined location, a transport mechanism according to claim 1 wherein said variable speed mechanism comprises a drive element mounted to rotate about the same axis of rotation of one of said shafts and having a portion offset from said axis, a drive member fixed to said shaft and having a portion radially extending therefrom, and a drive pinion interconnecting said drive element and said drive member to follow a circular path about said axis to thereby rotate said shaft.

6. For use in a material handling system for transporting a plurality of like objects from a storage compartment thereof to a predetermined location, a transport mechanism according to claim 5 wherein said drive pinion is formed with an offset between said drive element and said drive member and is rotatably mounted in each of said drive element and member, and means is provided for rotating said drive pinion as it follows said circular path to cause said offset to vary the speed of rotation of said shaft relative to the speed of rotation of said drive element.

7. For use in a material handling system for transporting a plurality of like objects from a storage compartment thereof to a predetermined location, a transport mechanism according to claim 6 wherein said plurality of shafts are coaxially mounted and each is provided with a radially extending drive member, said drive pinion interconnecting said drive element and each of said drive members and being formed with an offset in each such interconnection whereby the speed of rotation of each shaft is varied in accordance with its respective drive pinion offset.

8. For use in a material handling system for transporting a plurality of like objects from a storage compartment thereof to a predetermined location, a transport mechanism according to claim 7 wherein each of said offsets is an eccentric shaft portion formed on said drive pinion.

9. For use in a material handling system for transporting a plurality of like objects from a storage compartment thereof to a predetermined location, a transport mechanism according to claim 8 wherein said drive pinion is formed with gear teeth for mating engagement with a relatively stationary ring gear whereby as said drive pinion follows said circular path about said axis said ring gear causes said drive pinion to be rotated to thereby cause said eccentric shaft portion to vary the rate of rotation of said shafts.

10. For use in a material handling system for transporting a plurality of like objects from a storage compartment thereof to a predetermined location, a transport mechanism according to claim 1 wherein is included a merger unit comprising a generally cylindrical rotor formed with longitudinal guide means, an object holder for each of said inlet openings movably positioned in said guide means, and operating means for said holders for moving said holders into alignment with said outlet opening to thereby interleave said objects in a single row at said outlet opening 11. For use in a material handling system for transporting a plurality of like objects from a storage compartment thereof to a predetermined location, a transport mechanism according to claim 10 wherein said operating means comprises a frame member having a cam surface formed thereon and a separate cam follower fixed to each of said holders and in engagement with said cam surface whereby as said rotor rotates relative to said frame member said holders are cam operated to position said objects at said outlet opening.

12. For use in a material handling system for transporting a plurality of like objects from a storage compartment thereof to a predetermined location, a transport mechanism according to claim 1 wherein is included a merger unit adapted to receive said objects from said spacing unit and to merge the objects from said inlet openings into a single row at said outlet opening by causing each object to move into a space between objects from another of said inlet openings.

13. For use in a material handling system for transporting a plurality of like objects from a storage compartment thereof to a predetermined location, a transport mechanism according to claim 2 wherein said spacing unit and said merger unit are driven by the same source of power and transmission means is operatively connected thereto to coordinate said spacing and merger operations as said objects are moved through said transport mechanism.

14. For use in a material handling system for transporting a plurality of like objects from a storage compartment thereof to a predetermined location, a transport mechanism according to claim 4 wherein said drive pin is formed with gear teeth for mating engagement with a relatively stationary ring gear whereby as said drive pin follows said circular path about said axis said ring gear causes said drive pin to be rotated to thereby cause said eccentric cam portion to vary the rate of rotation of said shafts.

15. For use in a material handling system for transporting a plurality of like objects from a storage compartment thereof to a predetermined location, a transport mechanism according to claim 4 wherein said operating means comprises frame member having a cam surface formed thereon and a separate cam follower fixed to each of said holders and in engagement with said cam surface whereby as said rotor rotates relative to said frame member said holders are cam operated to position said objects at said outlet opening.

* * * * *